US011093282B2

United States Patent
Barrick et al.

(10) Patent No.: US 11,093,282 B2
(45) Date of Patent: Aug. 17, 2021

(54) REGISTER FILE WRITE USING POINTERS

(71) Applicant: International Business Machines Corporation, Armonk, NY (US)

(72) Inventors: Brian D. Barrick, Pflugerville, TX (US); Steven J. Battle, Austin, TX (US); Joshua W. Bowman, Austin, TX (US); Cliff Kucharski, Austin, TX (US); Hung Q. Le, Austin, TX (US); Dung Q. Nguyen, Austin, TX (US); David R. Terry, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 16/383,775

(22) Filed: Apr. 15, 2019

(65) Prior Publication Data

US 2020/0326978 A1    Oct. 15, 2020

(51) Int. Cl.
*G06F 9/48* (2006.01)
*G06F 9/30* (2018.01)
*G06F 12/12* (2016.01)
*G06F 9/54* (2006.01)

(52) U.S. Cl.
CPC ........ *G06F 9/4881* (2013.01); *G06F 9/30098* (2013.01); *G06F 9/544* (2013.01); *G06F 12/12* (2013.01)

(58) Field of Classification Search
CPC .... G06F 9/4881; G06F 9/544; G06F 9/30098; G06F 13/122; G06F 9/54
See application file for complete search history.

(56) References Cited

U.S. PATENT DOCUMENTS

| | | | | |
|---|---|---|---|---|
| 5,809,550 | A * | 9/1998 | Shukla | G06F 12/0804 711/118 |
| 2004/0172521 | A1* | 9/2004 | Hooker | G06F 9/3855 712/225 |
| 2011/0191637 | A1* | 8/2011 | Wight | G06F 11/00 714/43 |
| 2011/0225278 | A1* | 9/2011 | Monchiero | H04L 49/901 709/223 |
| 2015/0370535 | A1* | 12/2015 | Ralston | G06F 13/128 710/310 |
| 2016/0202990 | A1* | 7/2016 | Brownscheidle | G06F 9/3836 712/23 |
| 2016/0357566 | A1 | 12/2016 | Bowman et al. | |
| 2017/0075811 | A1* | 3/2017 | Hsu | G06F 3/0685 |
| 2017/0109093 | A1 | 4/2017 | Chu et al. | |
| 2017/0109167 | A1 | 4/2017 | Eisen et al. | |
| 2018/0173642 | A1* | 6/2018 | Vattakandy | G06F 12/0857 |

* cited by examiner

*Primary Examiner* — Tuan C Dao
(74) *Attorney, Agent, or Firm* — Cantor Colburn LLP; Bryan Bortnick

(57) ABSTRACT

A non-limiting example of a computer-implemented method for file register writes using pointers includes, responsive to a dispatch instruction, storing, at a location in a history buffer, an instruction tag and first data associated with the instruction tag. The method further includes storing a pointer in an issue queue. The pointer points to the location in the history buffer. The method further includes performing a write back of second data using the pointer stored in the issue queue. The write back writes the second data into the location of the history buffer associated with the pointer.

17 Claims, 3 Drawing Sheets

REGISTER FILE WRITE USING POINTERS

BACKGROUND

The present invention generally relates to computer processing devices, and more specifically, to register file writes using pointers in a distributed history buffer design.

Content addressable memory (CAM), also known as associative memory, performs searching by comparing input search data (referred to as "tags") against a table of stored data. The address of the matching data (or the matching data) is returned as the search results. The searching is generally performed in a single clock cycle.

SUMMARY

Embodiments of the present invention are directed to a computer-implemented method for file register writes using pointers. A non-limiting example of the computer-implemented method includes, responsive to a dispatch instruction, storing, at a location in a history buffer, an instruction tag and first data associated with the instruction tag. The method further includes storing a pointer in an issue queue. The pointer points to the location in the history buffer. The method further includes performing a write back of second data using the pointer stored in the issue queue. The write back writes the second data into the location of the history buffer associated with the pointer.

Embodiments of the present invention are also directed to a system that includes a memory including computer readable instructions. The system also includes a processing device for executing the computer readable instructions for performing a method. A non-limiting example of the method includes, responsive to a dispatch instruction, storing, at a location in a history buffer, an instruction tag and first data associated with the instruction tag. The method further includes storing a pointer in an issue queue. The pointer points to the location in the history buffer. The method further includes performing a write back of second data using the pointer stored in the issue queue. The write back writes the second data into the location of the history buffer associated with the pointer.

Embodiments of the present invention are directed a computer program product that includes a computer readable storage medium having program instructions embodied therewith, the program instructions executable by a processing device to cause the processing device to perform a method. A non-limiting example of the method includes, responsive to a dispatch instruction, storing, at a location in a history buffer, an instruction tag and first data associated with the instruction tag. The method further includes storing a pointer in an issue queue. The pointer points to the location in the history buffer. The method further includes performing a write back of second data using the pointer stored in the issue queue. The write back writes the second data into the location of the history buffer associated with the pointer.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
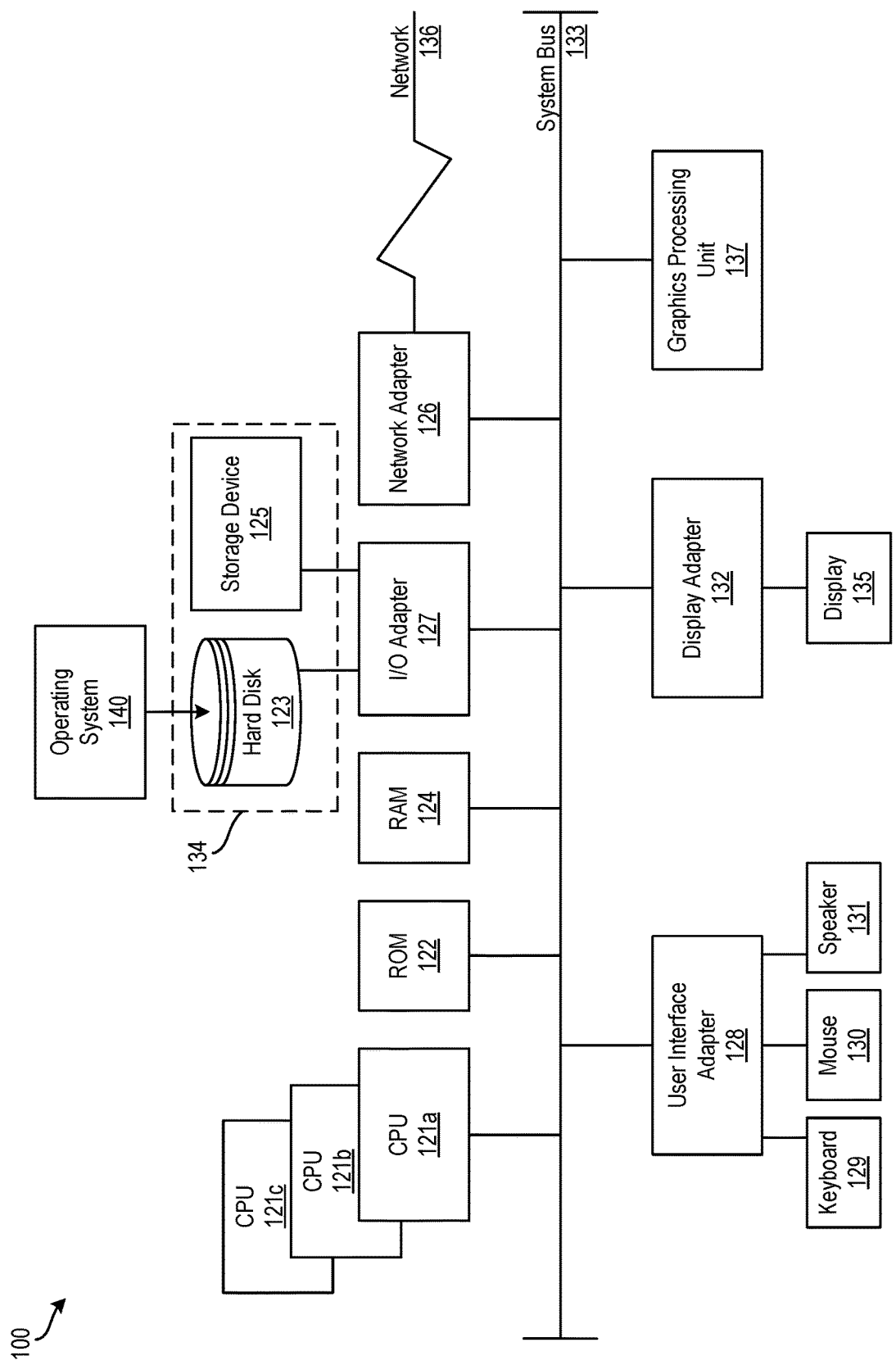
FIG. 1 depicts a block diagram of a processing system for implementing the presently described techniques according to one or more embodiments described herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood that the present disclosure is capable of being implemented in conjunction with any other type of computing environment now known or later developed. For example, FIG. 1 depicts a block diagram of a processing system 100 for implementing the techniques described herein. In examples, processing system 100 has one or more central processing units (processors) 121a, 121b, 121c, etc. (collectively or generically referred to as processor(s) 121 and/or as processing device(s)). In aspects of the present disclosure, each processor 121 can include a reduced instruction set computer (RISC) microprocessor. Processors 121 are coupled to system memory (e.g., random access memory (RAM) 124) and various other components via a system bus 133. Read only memory (ROM) 122 is coupled to system bus 133 and may include a basic input/output system (BIOS), which controls certain basic functions of processing system 100.

Further depicted are an input/output (I/O) adapter 127 and a network adapter 126 coupled to system bus 133. I/O adapter 127 may be a small computer system interface (SCSI) adapter that communicates with a hard disk 123 and/or a storage device 125 or any other similar component. I/O adapter 127, hard disk 123, and storage device 125 are collectively referred to herein as mass storage 134. Operating system 140 for execution on processing system 100 may be stored in mass storage 134. The network adapter 126 interconnects system bus 133 with an outside network 136 enabling processing system 100 to communicate with other such systems.

A display (e.g., a display monitor) 135 is connected to system bus 133 by display adapter 132, which may include a graphics adapter to improve the performance of graphics intensive applications and a video controller. In one aspect of the present disclosure, adapters 126, 127, and/or 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 may be interconnected to system bus 133 via user interface adapter 128, which may include, for example, a Super I/O chip integrating multiple device adapters into a single integrated circuit.

In some aspects of the present disclosure, processing system 100 includes a graphics processing unit 137. Graphics processing unit 137 is a specialized electronic circuit designed to manipulate and alter memory to accelerate the creation of images in a frame buffer intended for output to a display. In general, graphics processing unit 137 is very efficient at manipulating computer graphics and image processing, and has a highly parallel structure that makes it more effective than general-purpose CPUs for algorithms where processing of large blocks of data is done in parallel.

Thus, as configured herein, processing system 100 includes processing capability in the form of processors 121, storage capability including system memory (e.g., RAM 124), and mass storage 134, input means such as keyboard 129 and mouse 130, and output capability including speaker 131 and display 135. In some aspects of the present disclosure, a portion of system memory (e.g., RAM 124) and mass storage 134 collectively store the operating system 140 such as the AIX® operating system from IBM Corporation to coordinate the functions of the various components shown in the processing system 100.

Turning now to an overview of technologies that are more specifically relevant to aspects of the invention, some computing systems use a register file and history buffer (HB) to compare a write back (WB) instruction tag (ITAG) with an entry's ITAG. When the WB ITAG matches the entry's ITAG (i.e., at matched location), the WB data is written into the HB. This is referred to as a CAM write design, which consumes a lot of power and silicon since each location needs to have multiple ITAG compares (one for each WB ITAG).

The techniques described herein use less power and silicon by allowing write back into the HB with the use of pointers instead of CAM compares. Thus, the present techniques provide a CAM-less register file write. The register file uses a logical register (LREG) to read out the ITAG prior to performing a comparison with the write back ITAG. This design eliminates the need for CAM compares and reduces silicon and power significantly.

Figure 2:
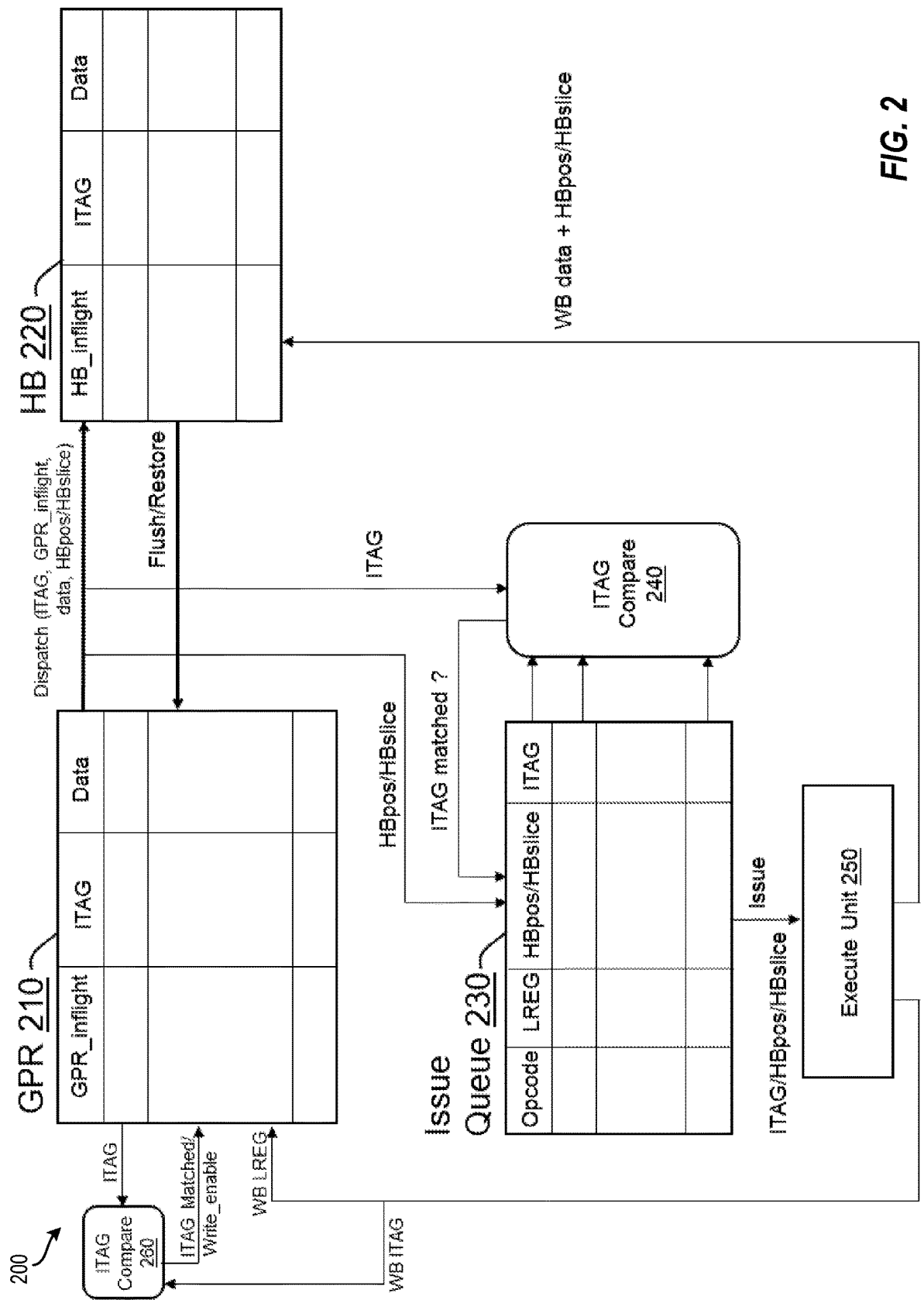
FIG. 2 depicts a block diagram of an architecture for register file writes using pointers in a distributed history buffer design according to examples of the present disclosure.

Turning now to a more detailed description of aspects of the present invention, FIG. 2 depicts a block diagram of an architecture 200 for a register file writes using pointers in a distributed history buffer design according to examples of the present disclosure. The architecture 200 includes a general purpose register (GPR) 210, a history buffer (HB) 220, an issue queue 230, an ITAG compare unit 240, an execute unit 250, and an ITAG compare unit 260. As will be appreciated, the architecture 200 is CAM-less: it uses pointers instead of traditional CAM compare operations to perform register file writes (i.e., write backs).

When a dispatch instruction occurs, the GPR 210 entry corresponding to the destination logical register (LREG) for the dispatching instruction is written with the new ITAG assigned to the instruction, the issue queue 230 is written with the new instruction opcode, ITAG, and LREG, and the HB 220 is written. The LREG destination for the instruction is used to read out the old ITAG/data from the GPR 210. Then the ITAG/data is written into the HB 220. The location within the HB 220 that the old ITAG and data from the GPR 210 is being written into is referred to as HB position (HBpos) and HB slice (HBslice). The dispatch instruction comprises the instruction tag, a bit setting for a GPR inflight status, the first data, and the pointer.

For a distributed HB design, the Hbslice bit is used to indicate which HB slice of the HB 220 that the HBpos should write to.

When the old ITAG is read out of the GPR 210 at the LREG's location (to store it in the HB 220), GPR_inflight is set high (to 1) at the same location to indicate that this location can be written by an in-flight destination LREG at write back time.

At the corresponding HB location, HB_inflight is set high (to 1) if GPR_inflight is high (1) to indicate that this HB location can be written to by an in-flight HBpos/HBslice at write back time. If GPR_inflight is set to low (is 0), HB_inflight is set low (to 0) as well.

The new HBpos and the HBslice allocated at dispatch time is sent to the issue queue 230 along with the instruction. The HBpos/HBslice is used to write execution results into the HB 220 during write back. The readout GPR ITAG is sent to the issue queue 230.

At the issue queue 230, the GPR ITAG is used to compare against the destination ITAGs in the issue queue 230. This is performed by the ITAG compare block 240. At a matched location, the HBpos/HBslice is written in the issue queue 230 to indicate the data should be written into the HB 220 instead of the GPR 210. In other words, the GPR entry is being evicted from the GPR 210 and moved to the HB 220, thus the new location of HB 220 is being passed down to the previous instruction.

At issue time, when an instruction is issued to the execute unit 250, the HBpos/HBslice and the destination LREG are sent to the execute unit 250 along with the instruction.

At write back time, the execute unit 250 uses the HBpos and the HBslice bits stored in the issue queue 230 to write the write back data into the correct HB 220 location. This occurs instead of doing an ITAG CAM look up to see which matched location to write in. The HBpos and HBslice are used as a write address into the HB 220, and the write back result is written in if HB_inflight is set high (is 1) at that location. The HB_inflight is set low (to 0) after the write back data is written.

At write back time, the execute unit 250 uses the destination LREG and ITAG to write into the GPR 210. The LREG is used to read the ITAG out of the GPR 210. Then, the read out ITAG is used to match, by the ITAG compare block 260, against the write back ITAG. At the matched location, the write back result is written in the GPR 210 using the LREG as the GPR write address, and then the GPR_inflight is set low (to 0).

At completion time, GPR_inflight and the HB_inflight each remain set low (to 0) at the GPR 210 at the completed GPR/HB locations to indicate that HBpos/HBslice cannot be used as write address to those HB locations.

At flush time, the HB_inflight is restored, and ITAGs to the RF as normal. If HB_inflight is set high (to 1), then the GPR_inflight is set high (to 1) at the restored GPR location. If the HB_inflight is set low (to 0), then the GPR_inflight is set low (to 0) at the restored GPR location.

Figure 3:
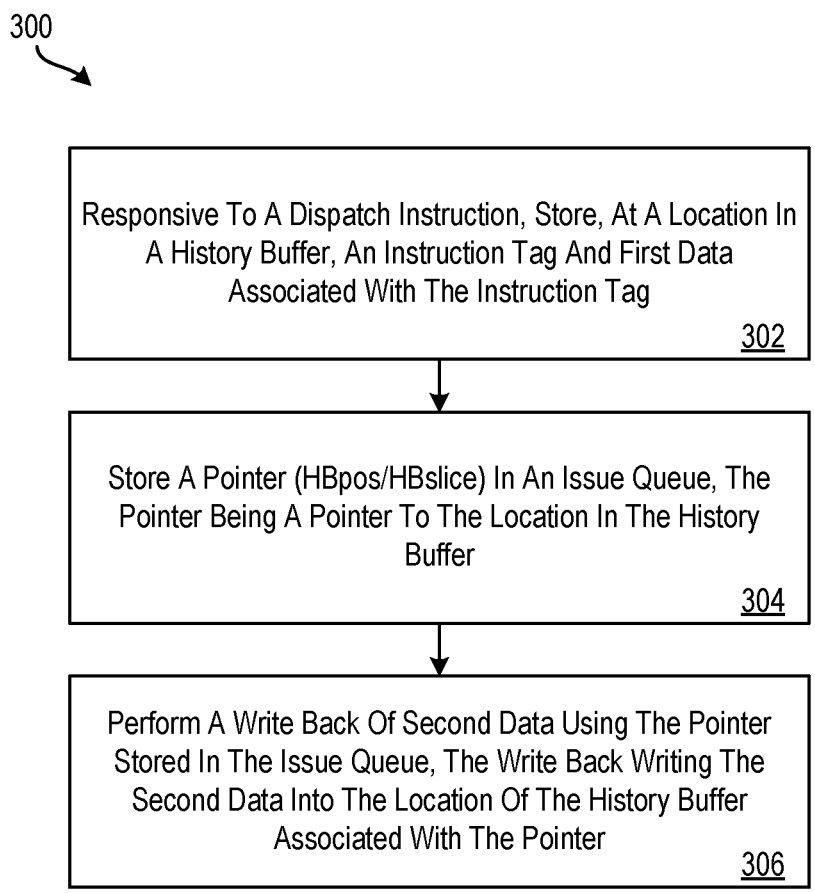
FIG. 3 depicts a flow diagram of a method for register file writes using pointers according to examples of the present disclosure.

FIG. 3 depicts a flow diagram of a method 300 register file writes using pointers according to examples of the present disclosure. The method 300 can be implemented, for example, using the processing system 100 of FIG. 1 and/or the architecture 200 of FIG. 2.

At block 302, the method 300 includes, responsive to a dispatch instruction, a history buffer 220 storing, at a location in the history buffer 220, an instruction tag and first data associated with the instruction tag. The dispatch instruction can include the instruction tag, a bit setting for an inflight bit for a general purpose register, the first data, and a pointer to the location.

At block 304, the method 300 includes an issue queue 230 storing a pointer in the issue queue 230. The pointer is a pointer to the location in the history buffer 220. For example, the location can include a history buffer position (i.e., a row in the history buffer). As another example, the location can include a history buffer slice (i.e., a slice of a history buffer that the history buffer position will write to in a distributed history buffer design).

At block 306, the method 300 includes an execute unit 250 performing a write back of second data using the pointer stored in the issue queue 230. The write back writes the second data into the location of the history buffer 220 associated with the pointer.

Additional processes also may be included. For example, the method 300 can include an ITAG compare block 240 performing a comparison between the instruction tag stored in the history buffer 220 and an instruction tag stored in the issue queue 230. Responsive to determining that the instruction tag stored in the history buffer matches the instruction tag stored in the issue queue 230, the pointer is written to the issue queue 230 to indicate that the second data should be written into the history buffer 220. In another example, the history buffer 220 can perform a flush operation that includes setting an inflight bit of the GPR 210 to match an inflight bit setting of the history buffer 220.

It should be understood that the process depicted in FIG. 3 represents an illustration, and that other processes may be added or existing processes may be removed, modified, or rearranged without departing from the scope and spirit of the present disclosure.

Example embodiments of the disclosure include or yield various technical features, technical effects, and/or improvements to technology. Example embodiments of the disclosure provide a CAM-less register file write architecture for a distributed history buffer that eliminates the overhead typically associated with performing CAM-based compares. These aspects of the disclosure constitute technical features that yield the technical effect of enabling write back to a history buffer with the use of pointers instead of using CAM compares. Accordingly, the present techniques use less processing resources, power, silicon space, etc. than traditional CAM-based techniques. As a result of these technical features and technical effects, the present techniques represent an improvement to existing write back techniques and thus represents an improvement to computer functionality. It should be appreciated that the above examples of technical features, technical effects, and improvements to technology of example embodiments of the disclosure are merely illustrative and not exhaustive.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
responsive to a dispatch instruction, storing, at a location in a history buffer, an instruction tag and first data associated with the instruction tag;

prior to storing a pointer in an issue queue, performing a comparison between the instruction tag stored in the history buffer and an instruction tag stored in the issue queue;

storing the pointer in the issue queue, the pointer pointing to the location in the history buffer; and performing a write back of second data using the pointer stored in the issue queue, the write back writing the second data into the location of the history buffer associated with the pointer.

2. The computer-implemented method of claim 1, wherein the location in the history buffer comprises a history buffer position.

3. The computer-implemented method of claim 1, wherein the location in the history buffer comprises a history buffer slice.

4. The computer-implemented method of claim 1, further comprising:

responsive to determining that the instruction tag stored in the history buffer matches the instruction tag stored in the issue queue, writing the pointer to the issue queue to indicate that the second data should be written into the history buffer.

5. The computer-implemented method of claim 1, wherein the dispatch instruction comprises the instruction tag, a bit setting for an inflight bit for a general purpose register, the first data, and the pointer.

6. The computer-implemented method of claim 1, further comprising:

performing a flush operation, wherein the flush operation comprises setting an inflight bit of a general purpose register to match an inflight bit setting of the history buffer.

7. A system comprising:

a memory comprising computer readable instructions; and a processing device for executing the computer readable instructions for performing a method comprising:

responsive to a dispatch instruction, storing, at a location in a history buffer, an instruction tag and first data associated with the instruction tag;

prior to storing a pointer in an issue queue, performing a comparison between the instruction tag stored in the history buffer and an instruction tag stored in the issue queue;

storing the pointer in the issue queue, the pointer pointing to the location in the history buffer; and performing a write back of second data using the pointer stored in the issue queue, the write back writing the second data into the location of the history buffer associated with the pointer.

8. The system of claim 7, wherein the location in the history buffer comprises a history buffer position.

9. The system of claim 7, wherein the location in the history buffer comprises a history buffer slice.

10. The system of claim 7, wherein the method further comprises:

responsive to determining that the instruction tag stored in the history buffer matches the instruction tag stored in the issue queue, writing the pointer to the issue queue to indicate that the second data should be written into the history buffer.

11. The system of claim 7, wherein the dispatch instruction comprises the instruction tag, a bit setting for an inflight bit for a general purpose register, the first data, and the pointer.

12. The system of claim 7, wherein the method further comprises:

performing a flush operation, wherein the flush operation comprises setting an inflight bit of a general purpose register to match an inflight bit setting of the history buffer.

13. A computer program product comprising:

a computer readable storage medium having program instructions embodied therewith, the program instructions executable by a processing device to cause the processing device to perform a method comprising:

responsive to a dispatch instruction, storing, at a location in a history buffer, an instruction tag and first data associated with the instruction tag;

prior to storing a pointer in an issue queue, performing a comparison between the instruction tag stored in the history buffer and an instruction tag stored in the issue queue;

storing the pointer in the issue queue, the pointer pointing to the location in the history buffer; and performing a write back of second data using the pointer stored in the issue queue, the write back writing the second data into the location of the history buffer associated with the pointer.

14. The computer program product of claim 13, wherein the location in the history buffer comprises a history buffer position.

15. The computer program product of claim 13, wherein the location in the history buffer comprises a history buffer slice.

16. The computer program product of claim 13, wherein the method further comprises:

responsive to determining that the instruction tag stored in the history buffer matches the instruction tag stored in the issue queue, writing the pointer to the issue queue to indicate that the second data should be written into the history buffer.

17. The computer program product of claim 13, wherein the dispatch instruction comprises the instruction tag, a bit setting for an inflight bit for a general purpose register, the first data, and the pointer.

* * * * *